(12) United States Patent
Kürschner et al.

(10) Patent No.: US 10,408,424 B2
(45) Date of Patent: Sep. 10, 2019

(54) LIGHT GUIDING DEVICE

(71) Applicant: SMR Patents S.à.r.l., Luxembourg (LU)

(72) Inventors: Norbert Kürschner, Wedemark (DE); Andreas Herrmann, Winnenden-Baach (DE); Chun Seop Kwak, Siheung-Si (KR); Ho Jin Huh, Youngtong-gu Suwon (KR)

(73) Assignee: SMR Patents S.à.r.l., Luxembourg (LU)

(*) Notice: Subject to any disclaimer, the term of this patent is extended or adjusted under 35 U.S.C. 154(b) by 0 days.

(21) Appl. No.: 16/119,149

(22) Filed: Aug. 31, 2018

(65) Prior Publication Data

US 2018/0372299 A1 Dec. 27, 2018

Related U.S. Application Data

(63) Continuation-in-part of application No. 15/916,650, filed on Mar. 9, 2018, which is a continuation of
(Continued)

(30) Foreign Application Priority Data

Jan. 19, 2015 (EP) .................................. 15151604

(51) Int. Cl.
*B60Q 1/26* (2006.01)
*B60Q 1/52* (2006.01)
(Continued)

(52) U.S. Cl.
CPC .......... *F21V 7/0091* (2013.01); *B60Q 1/2607* (2013.01); *B60Q 1/2665* (2013.01); *B60Q 1/2696* (2013.01); *B60Q 1/525* (2013.01); *B60R 1/1207* (2013.01); *F21S 43/14* (2018.01); *F21S 43/195* (2018.01); *F21S 43/239* (2018.01); *F21S 43/315* (2018.01); *F21S 45/50* (2018.01); *F21V 7/22* (2013.01); *F21V 9/08* (2013.01);
(Continued)

(58) Field of Classification Search
CPC .. F21V 7/0091; F21V 7/22; F21V 9/08; F21S 43/239; F21S 43/315; B60Q 1/2607; B60Q 1/2665; B60Q 1/2696; B60Q 1/525; B60R 1/1207; G02B 6/0064; G02B 6/0055
USPC ......................................................... 362/511
See application file for complete search history.

(56) References Cited

U.S. PATENT DOCUMENTS 4,912,606 A * 3/1990 Yamamoto ........... B60Q 1/2607
362/518
5,700,078 A * 12/1997 Fohl ..................... B60Q 1/0011
362/259
(Continued)

*Primary Examiner* — Bryon T Gyllstrom
(74) *Attorney, Agent, or Firm* — MacMillan, Sobanski & Todd, LLC

(57) ABSTRACT

A housing or pocket for supporting a light guide device for an illumination device, especially for a motor vehicle or an indicator device in a rearview device of a motor vehicle. The housing has a first side which is configured to support the light guiding device for exposure to the pictogram of the reflection layer. The housing also include a second side containing exposed wire connectors to connect the light guide device to a power source. One of the light guide device, the printed circuit board or both structures are fitted with an encapsulation member and secured to the housing through the use of a fixative mount.

20 Claims, 8 Drawing Sheets

Related U.S. Application Data application No. 15/000,733, filed on Jan. 19, 2016, now Pat. No. 10,168,021.

(51) Int. Cl.

| | | |
|---|---|---|
| *B60R 1/12* | (2006.01) | |
| *F21V 7/00* | (2006.01) | |
| *F21V 7/22* | (2018.01) | |
| *F21V 8/00* | (2006.01) | |
| *F21V 9/08* | (2018.01) | |
| *F21S 43/14* | (2018.01) | |
| *F21S 43/19* | (2018.01) | |
| *F21S 43/31* | (2018.01) | |
| *F21S 45/50* | (2018.01) | |
| *F21S 43/239* | (2018.01) | |
| *F21S 43/249* | (2018.01) | |

(52) U.S. Cl.
CPC ......... *G02B 6/0046* (2013.01); *G02B 6/0055* (2013.01); *F21S 43/249* (2018.01); *G02B 6/0078* (2013.01)

(56) References Cited

U.S. PATENT DOCUMENTS

| | | | | |
|---|---|---|---|---|
| 6,666,571 B2* | 12/2003 | Becher | ............ | B60J 7/00 362/490 |
| 7,097,334 B2* | 8/2006 | Ishida | ............ | F21S 41/147 362/516 |
| 7,331,694 B2* | 2/2008 | Lee | ............ | G02B 6/0018 362/231 |
| 7,350,930 B2* | 4/2008 | Lee | ............ | F21V 5/04 353/98 |
| 7,357,548 B2* | 4/2008 | Haenen | ............ | G02B 6/0028 362/511 |
| 7,513,665 B2* | 4/2009 | Chinniah | ............ | F21S 41/147 362/507 |
| 7,771,062 B2* | 8/2010 | Kuhn | ............ | B60Q 1/2665 359/839 |
| 8,033,706 B1* | 10/2011 | Kelly | ............ | G02B 6/0036 362/307 |
| 2002/0071267 A1* | 6/2002 | Lekson | ............ | F21S 43/249 362/610 |
| 2003/0235046 A1* | 12/2003 | Chinniah | ............ | F21S 41/24 362/602 |
| 2004/0042212 A1* | 3/2004 | Du | ............ | F21S 8/02 362/296.04 |
| 2004/0047161 A1* | 3/2004 | Mochizuki | ............ | F21S 43/14 362/511 |
| 2004/0109105 A1* | 6/2004 | Nagakubo | ............ | G02B 6/0055 349/65 |
| 2005/0195074 A1* | 9/2005 | Kano | ............ | B60Q 1/2665 340/475 |
| 2007/0008736 A1* | 1/2007 | Gasquet | ............ | B60Q 1/2607 362/511 |
| 2008/0013333 A1* | 1/2008 | Koizumi | ............ | B60Q 1/2696 362/511 |
| 2013/0188377 A1* | 7/2013 | Konishi | ............ | B60Q 1/04 362/511 |
| 2015/0055361 A1* | 2/2015 | Ogata | ............ | B60Q 1/28 362/511 |
| 2015/0131324 A1* | 5/2015 | de Lamberterie | ... | G02B 6/0035 362/623 |
| 2016/0193955 A1* | 7/2016 | Ogata | ............ | B60Q 1/0052 362/511 |

* cited by examiner

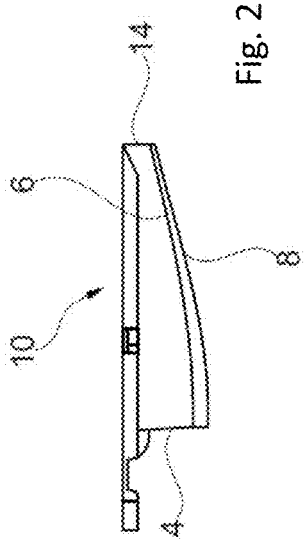
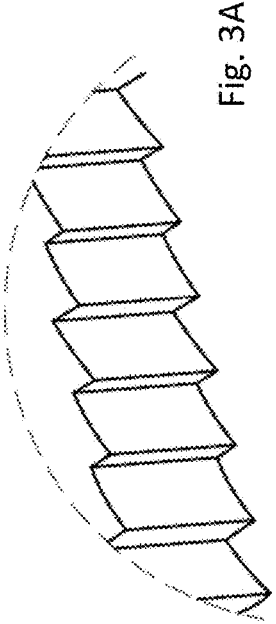
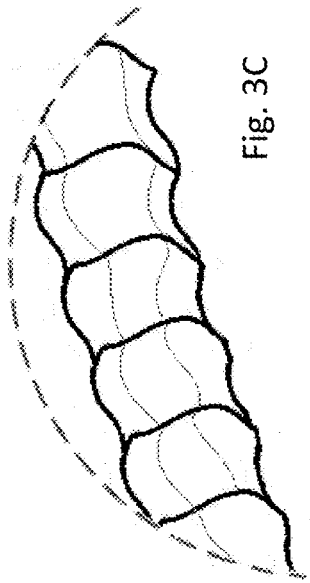
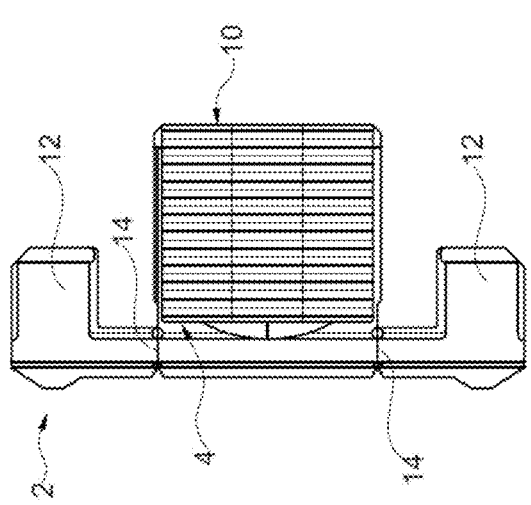
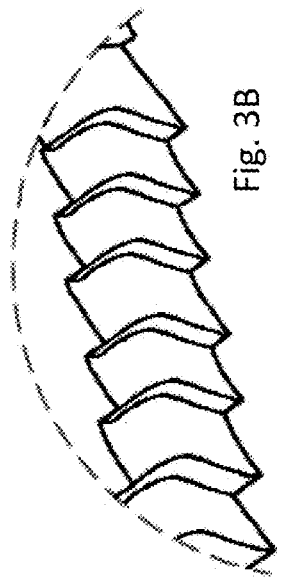

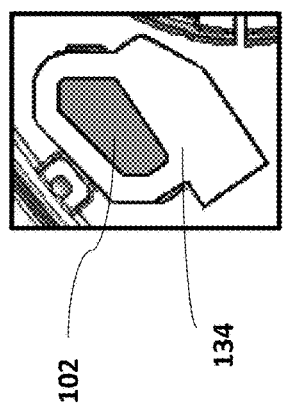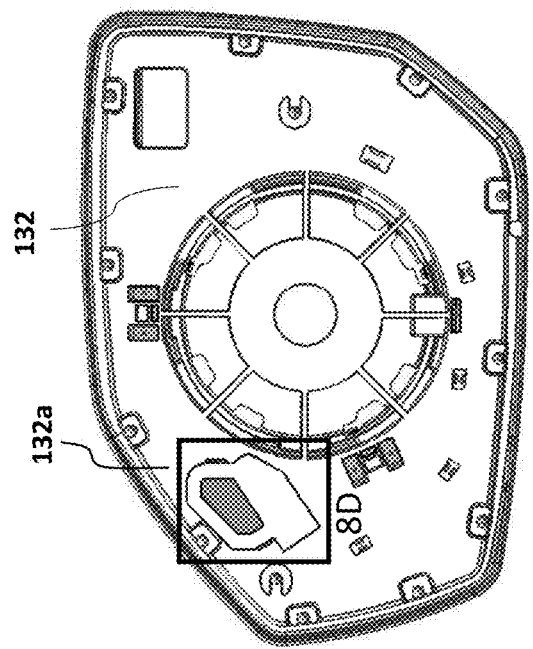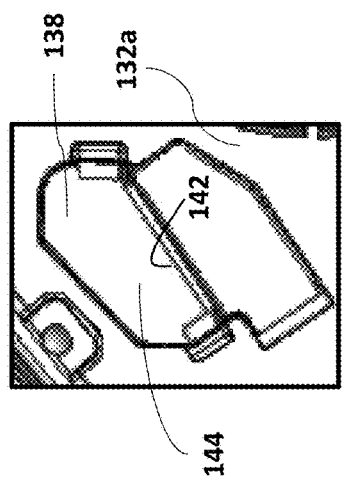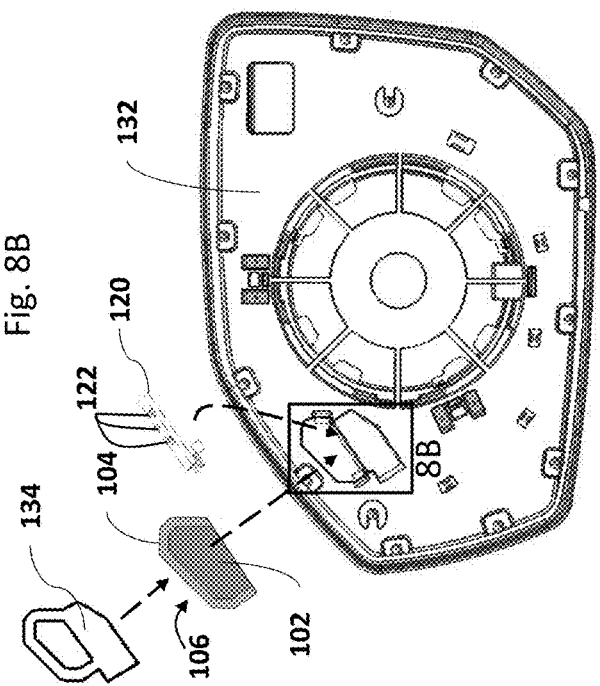

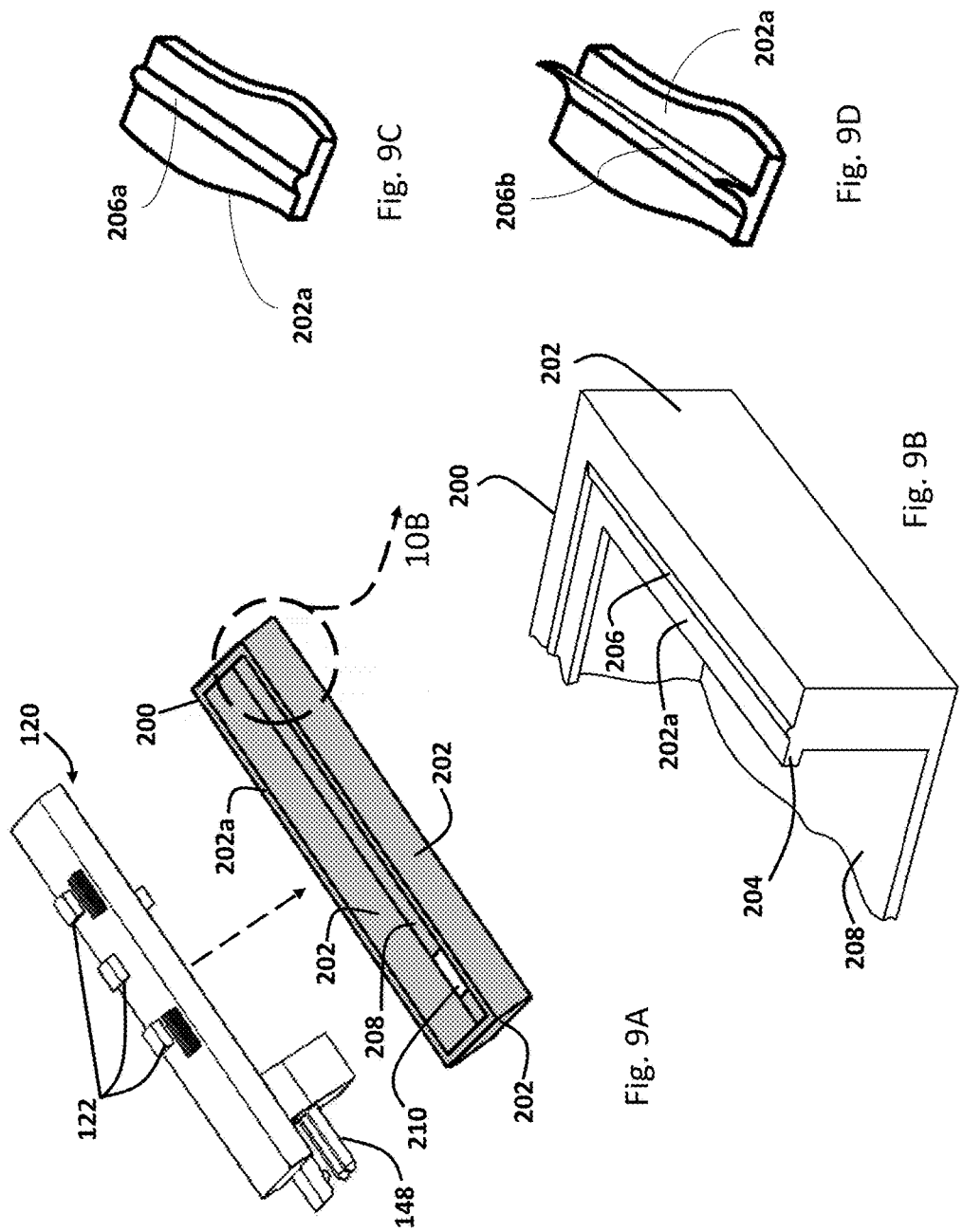

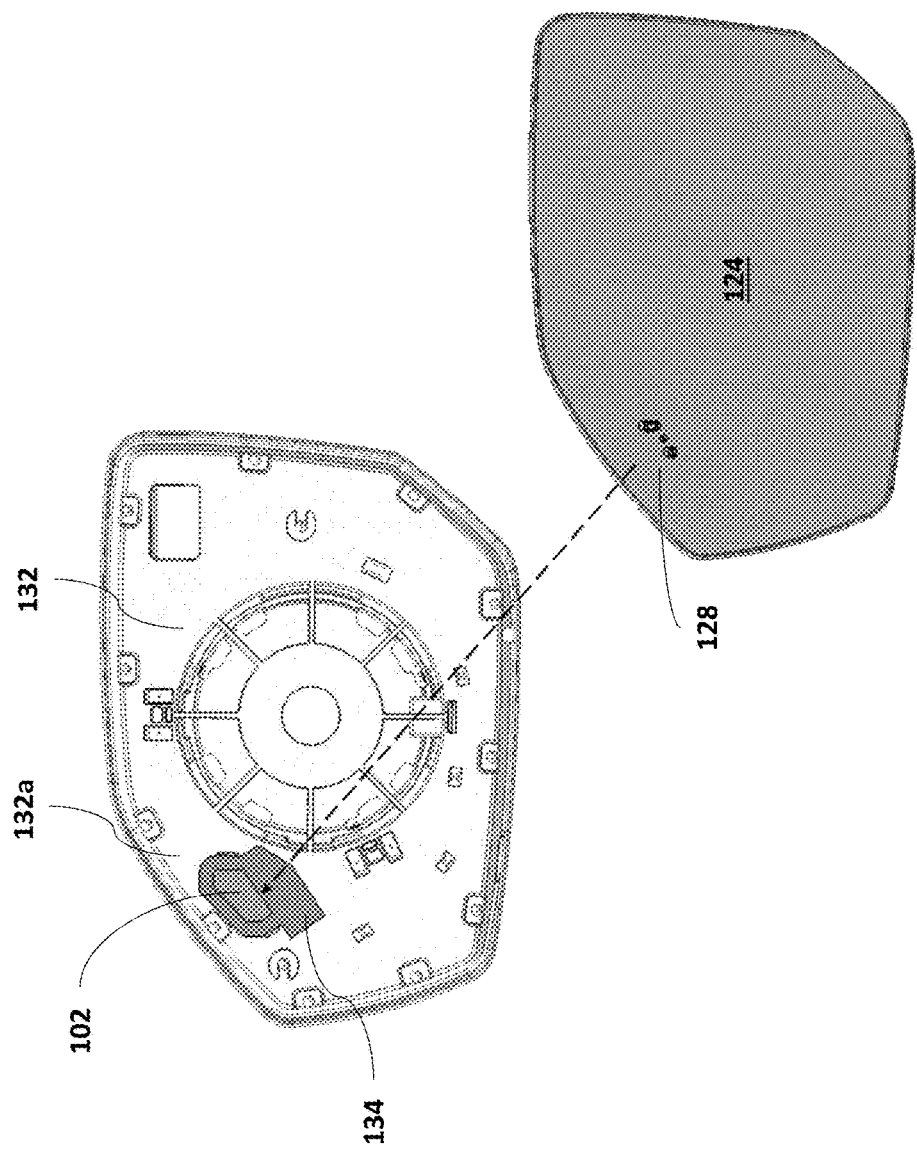

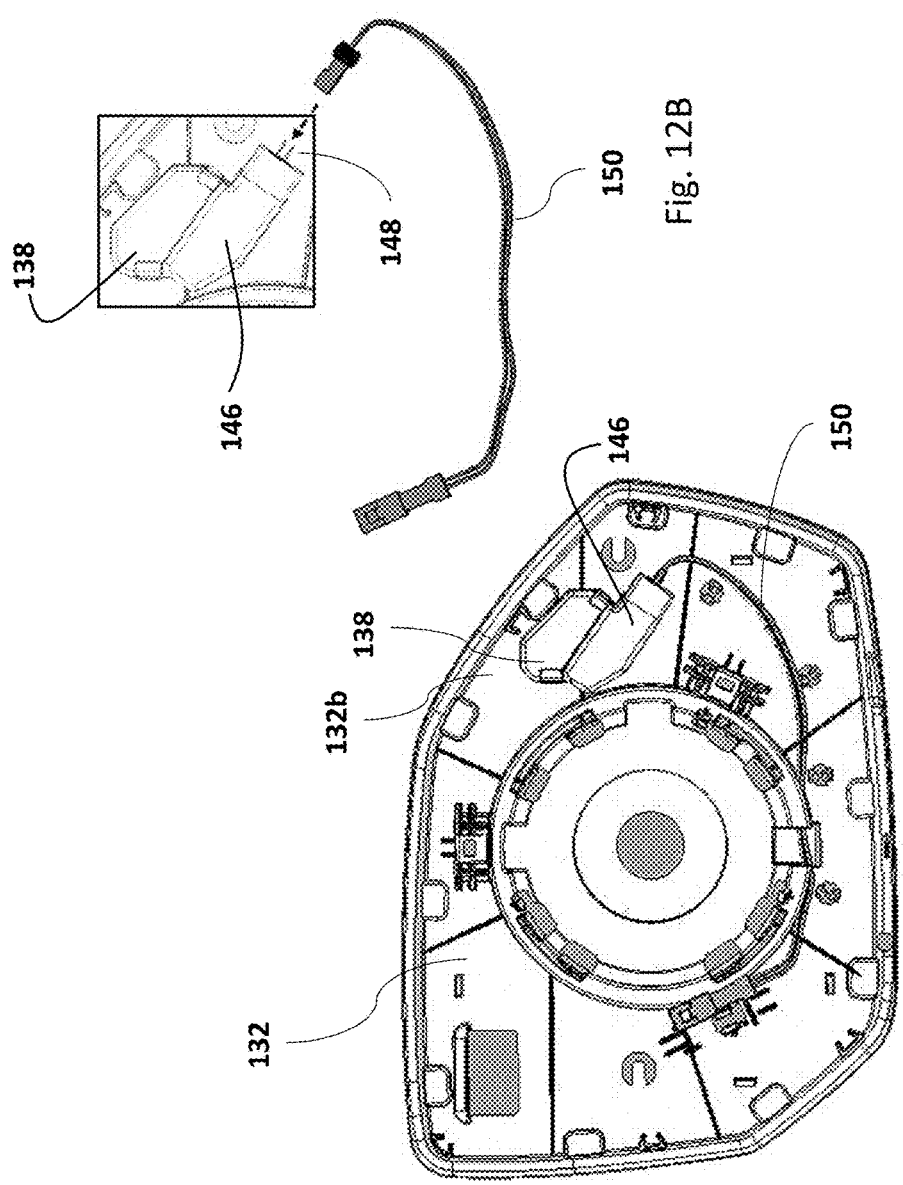

LIGHT GUIDING DEVICE

CROSS-REFERENCE TO RELATED APPLICATIONS

This application is a continuation-in-part patent application of U.S. patent application Ser. No. 15/916,650, filed Mar. 9, 2018 which is a continuation application of U.S. patent application Ser. No. 15/000,733, filed Jan. 19, 2016. U.S. patent application Ser. No. 15/000,733, filed Jan. 19, 2016 claims the benefit of European Patent Application No. EP 15151604.4, filed Jan. 19, 2015. Thus, the subject nonprovisional application claims priority to European Patent Application No. EP 15151604.4, filed Jan. 19, 2015. The disclosures of these applications are incorporated herein by reference in their entirety.

BACKGROUND OF THE INVENTION

The invention relates to a light guiding device for an illumination device, such as a backlight or interior or exterior lighting, wherein incident light is deflected by reflection. The light guiding device can particularly be used in an indicator of a motor vehicle, in connection with a blind spot monitor in an outside mirror for example. The invention also relates to an illumination device, an outside mirror having such a light guiding device and a method for producing such a light guiding device.

In known light guiding devices, it has proven disadvantageous that the light deflected by the light guiding device is outcoupled relatively inhomogeneously over a surface to be illuminated. This effect becomes ever more obvious, the larger the surface to be illuminated and the greater the distance between the surface to be illuminated and a light source. For example if a pictogram of small line width, 0.4 mm for example, of a blind spot monitor is backlit by a known light guiding device, the inhomogeneity can be negligible. As the line width of the pictogram increases, 1.0 mm for example, the inhomogeneity becomes quite visible and the user finds it disturbing. In the extreme case, a very non-uniform illumination of a pictogram can cause the user to misinterpret an indicator light as not illuminated.

WO 01/27529 A1 describes a light guide having an input edge surface, a back surface and an output surface, wherein a reflector is fastened directly to the back surface by gluing for example.

EP 2463157 A1 discloses a rearview mirror assembly having at least one mirror base, a mirror head covering which covers a mirror glass in the mirror head, and an optical indicator light that produces light in reaction to a sensor signal to inform an operator about hazardous information, wherein the light shines through the mirror glass. The mirror glass is mounted on a backing plate that has a mounting space for at least one LED and at least one beveled light guide.

EP 1167870 A2 discloses a lamp for vehicles, especially for motor vehicles, comprising a lamp housing that is bounded by a front disc in the emission direction, and at least one elongate light conduction element having a light exit surface on its front side, a reflection surface on its rear side facing away from the front side and a light input surface at one end which is coupled to a light source, wherein the light exit surface of the light conduction element is configured as part of the front disc.

DE 202012100398 U1 discloses an illumination apparatus having at least one illuminant that is arranged on a printed circuit board enabling it to be connected to a power supply, wherein the printed circuit board is at least partially imbedded in a transparent first casting compound that enables a selective light exit of the light generated by the illuminant over at least one light exit area. To this end the printed circuit board extends perpendicular to the light exit area, is arranged in and is at least partially surrounded by the first transparent casting compound, and at least one light influencing element having light-reflecting properties at least on one of its two main surfaces is arranged in the first casting compound.

EP 1970736 A1 relates to a rearview mirror for vehicles, especially motor vehicles, having a mirror glass mounted to a carrier plate and an indicator unit which is disposed behind the mirror glass and the carrier plate and generates a light beam by means of at least one illuminant, wherein the light beam is coupled into a light conductor, which is provided with decoupling optics by which the light beam is directed outward by at least one portion of the mirror glass that is at least partially reflection-free, wherein the light passing through the mirror glass is directed towards the driver.

In one embodiment example of the invention a light guiding device is provided that improves a homogenous light distribution on a light outcoupling surface.

This embodiment and other embodiments disclosed herein or understood as equivalent structures are described by a light guiding device having the features of claim 1.

Additional embodiments or features of light guiding devices according to the invention are described in claims 2 through 10.

SUMMARY OF THE INVENTION

The light guiding device has a light incoupling side for coupling light from a light source into the light guiding device, a reflection side having a reflection layer for reflecting the incoupled light and a light outcoupling side. The light outcoupling side is preferably disposed essentially opposite the reflection side. The clearance between the reflection side and the light outcoupling side preferably basically decreases as the distance from the light incoupling side increases. This decrease of the clearance can occur at least partially nonlinear. In other words, the reflection side and/or the reflection layer can not only extend linearly inclined relative to the light outcoupling side, but can also extend arc-shaped or convex. The reflection side having the reflection layer is embodied so that the light arriving at the light outcoupling side from the light incoupling side is deflected in order to thus produce a light distribution on the light outcoupling side that is more uniform or is as uniform as possible.

The light guiding device can comprise a light guide body upon which the light incoupling side, the light outcoupling side and the reflection side are formed. The light guide body may be further divided into discrete regions having independently operating light guiding funnels. Each independently operating light guiding funnel may provide homogenous illumination of a portion of the light outcoupling side to illuminate a target such as a logo or other pictogram for a specific purpose. In addition, each of the light guiding funnels may be further divided into discrete regions or focus areas within a particular funnel to provide a homogenous illumination over a portion of the light outcoupling side associated with a specific funnel. Alternatively, the light guiding funnels may be of different longitudinal or lateral dimensions yet each be configured to fully illuminate the respective light outcoupling regions associated therewith.

The light guiding device can be used in an illumination device to produce an illumination result over a certain surface that is as homogenous as possible by means of one or a plurality of light sources having a relatively limited light distribution, LEDs for example. The light guide device can be used in an indicator device of a motor vehicle, for example. An example is an indicator device in a rearview device like a driver assistance system, such as a blind spot monitor. The light guiding device according to the invention can particularly be used for the most homogenous possible illumination or backlighting of a pictogram, such as a blind spot monitor for example.

The reflection layer is arranged on the reflection side. The reflection layer is a paint or lacquer layer that is imprinted or evaporation-coated on the reflection side.

In another embodiment, the reflection layer can be made of another material or of the same material as the rest of the light guiding device. Preferred materials are plastics, especially acrylonitrile-butadiene-styrene (ABS) and/or polymethyl methacrylate (PMMA) or plastics with similar material properties. For example, both the reflection layer and the rest of the light guiding device are made of PMMA. The light guiding device can also be a two-component plastic injection molded part, wherein the reflection layer is injected as an ABS plate, white or colored for example, and then the rest of the light guiding device is formed on the reflection layer with transparent or clear PMMA. In embodiments having independently operating regions, each tunnel includes the reflection layer.

In an additional embodiment, the reflection layer can be made of a white sheet, such as a wood pulp filter or piece of paper.

The reflection side and/or the reflection layer can be configured at least partially step-like and/or wave-like. The steps or waves are embodied so that the light arriving from the light incoupling side is deflected so that it exits from the light outcoupling side as uniformly as possible. In embodiments having independently operating regions, each tunnel can have a specific reflection side and/or reflection layer. For example, the step-like and/or wave-like configuration might be different for the different funnels and/or the respective configuration might be restricted to certain discrete funnel regions. Still further, a step-like and/or wave-like configuration can be provided in different directions, especially in both the longitudinal and the lateral directions, and can lead to a variety of three dimensional surface structures like a dome- or cushion-like configuration.

The light incoupling side and the light outcoupling side can be configured flat and these surfaces can be arranged essentially orthogonal or approximately orthogonal to one another. The surfaces of the light incoupling side and the light outcoupling side can form planes. The upper surface of the light incoupling side can be embodied or shaped in such a manner that light arriving from a light source is coupled into the light guiding device as completely as possible and preferably as parallel to the light outcoupling side as possible. To this end in particular the light incoupling side can demonstrate one or a plurality of optical systems and/or recesses, wherein light sources can be at least partially inserted into the recesses.

The light guiding device can be embodied so that light coupled into the light guiding device and/or reflected and/or outcoupled essentially experiences no change in color. To this end, the reflection layer can be made of a color-neutral material, which is silvery or white. A change in color can be obtained by arranging one or a plurality of color filters on the light incoupling side and/or the reflection side and/or the reflection layer and/or the light outcoupling side and/or inside the light guiding device. The light from a light source that emits white light can thereby be coupled out of the light guiding device colored, such as red or yellow or green for example. A color layer can have a heat resistance of around −40° C. to +115° C.

The light guiding device can furthermore demonstrate one or a plurality of holding devices to tightly or loosely fasten the light guiding device to a printed circuit board.

The invention furthermore relates to an illumination device having a light guiding device comprising at least one of the aforementioned features and a printed circuit board upon which at least one light source is arranged. The light source is arranged relative to the light guiding device so that the light emitted by the light source is at least partially incoupled on the light incoupling side of the light guiding device. The light is subsequently reflected from the reflection side and/or the reflection layer and outcoupled on the light outcoupling side. The illumination device can be used in a motor vehicle, such as in an indicator device of a rearview device of a motor vehicle.

Associated with the illumination device is a method for producing a light guiding device. To this end, the reflection layer can be arranged on the base body in a pad printing machine, wherein optional cover templates can be used.

There is further described a rearview device for a motor vehicle comprising a rearview reflection surface, one or a plurality of illuminants and a light guiding device according to the invention, wherein the illuminant and the light guiding device can be an indicator of a blind spot monitor. To this end, the light guiding device, light source and rearview reflection surface can be arranged together in such a way that the light guiding device deflects the light emitted by the light source to a side of the rearview reflection surface facing away from the driver of the vehicle. Thus, one area of the rearview reflection surface can be visibly illuminated for the driver to provide an indicator function, a blind spot monitor for example.

In one embodiment, a blind spot monitor comprising a light guiding device is inserted into a pocket of a backing plate which forms a holder of at least one reflective element of a rear view device, with the holder especially being in the form of a glass holder.

One region of the rearview reflection surface can comprise a recess or a partially reflecting part, such as a pictogram that the light source and the light guiding device visibly backlight for a driver.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a top view of a first embodiment example of the light guiding device;

FIG. 2 is a side view of the first embodiment example according to FIG. 1;

FIG. 3A is a reflection side or reflection layer having a step-like structure;

FIG. 3B is a reflection side or reflection layer having a combined step-like and wave-like structure;

FIG. 3C is a reflection side or reflection layer having a wave-like structure;

FIG. 8A is an exploded view of a portion of a rear view assembly having a light guiding device, printed circuit board, and fixative mount to a housing when assembling one embodiment of a blind spot monitor.

FIG. 8B is an enlarged view of a housing or pocket of FIG. 8A in an embodiment of a blind spot monitor.

FIG. 8C is a plan view of a fixative mount securing a light guiding device to a housing in one embodiment of a blind spot monitor.

FIG. 8D is an enlarged view of a mounting portion of FIG. 8C showing the fixative mount securing the light guiding device to a housing in an embodiment of a blind spot monitor.

FIG. 9A is an exploded view of a printed circuit board and an encapsulation member configured to seal the printed circuit board associated with a light guiding device in a housing.

FIG. 9B is an enlarged, cut-away, perspective view of an embodiment of the encapsulation member of FIG. 9A.

FIG. 9C is a schematic view of an embodiment of a sealing face of the encapsulation member of FIG. 9A including a projecting rim FIG. 9D is a schematic view of an embodiment of a sealing face of the encapsulation member of FIG. 9A including a rubber lip.

FIG. 11 illustrates the attachment of a pictogram-containing reflective layer to the backing plate of the embodiment depicted in FIG. 8C or 10.

FIG. 12A illustrates a second side of the housing with a wire attached to wire connectors.

FIG. 12B is an enlarged view of the second side of the housing with the wire connectors positioned to engage a wire.

DETAILED DESCRIPTION OF THE PREFERRED EMBODIMENTS

Figure 5:
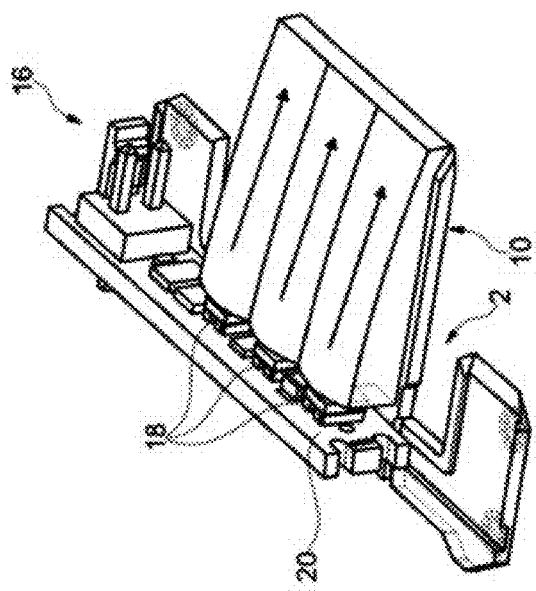
FIG. 5 is a perspective view of an illumination device having a light guiding device with focus on the light incoupling.

FIG. 1 depicts a top view of a light guiding device 2 having a light incoupling side 4, a reflection side 6, a reflection layer 8, and a light outcoupling side 10. In the top view of FIG. 1 the reflection side 6 is disposed under the light outcoupling side 10 and the reflection layer 8 is disposed under the reflection side 6. The light outcoupling side 10 is disposed opposite the reflection side 6 and therefore also opposite the reflection layer 8, so that reflected light reaches the light outcoupling side 10 as uniformly as possible. The clearance between the light outcoupling side 10 and the reflection side 6 and therefore also the reflection layer 8 decreases as the distance from the light incoupling side 4 increases, as shown in FIG. 2. The light outcoupling side 10 and the reflection side 6 can thus converge continuously or form an edge 14 that can also have a reflection layer 8.

By way of example FIG. 1 moreover depicts two holding devices 12, which extend away from the light guiding device 2 in the plane of the light outcoupling side 10, wherein each holding device demonstrates a predetermined breaking point 15. Depending on the application of the light guiding device, in a right or a left rearview device of a motor vehicle for example, the unneeded holding device 12 can be separated, broken off for example.

FIG. 2 depicts a side view of the light guiding device of FIG. 1. Light can enter the light guiding device 2 through the light incoupling side 4, especially basically parallel to the light outcoupling side 10. The reflection side 6 and the reflection layer 8 then deflect the light in the direction of the light outcoupling side 10.

FIG. 3A depicts an enlarged representation of a reflection side 6 and/or reflection layer 8 configured in a step-like configuration. Such a step-like configuration, which can alternatively or additionally be wave-like, can improve the guidance of the light beam arriving from the light incoupling side 4 to the effect that the light outcoupling by the light outcoupling side 10 is distributed as homogeneously as possible and uniformly across the light outcoupling side 10. FIG. 3B depicts an enlarged representation of the reflection side 6 configured as a combined wave-like and step-like surface configuration. FIG. 3C depicts an enlarged representation of the reflection side 6 configured as a compound wave-like surface configuration in both the longitudinal and lateral directions of the light outcoupling side 10.

Figure 4:
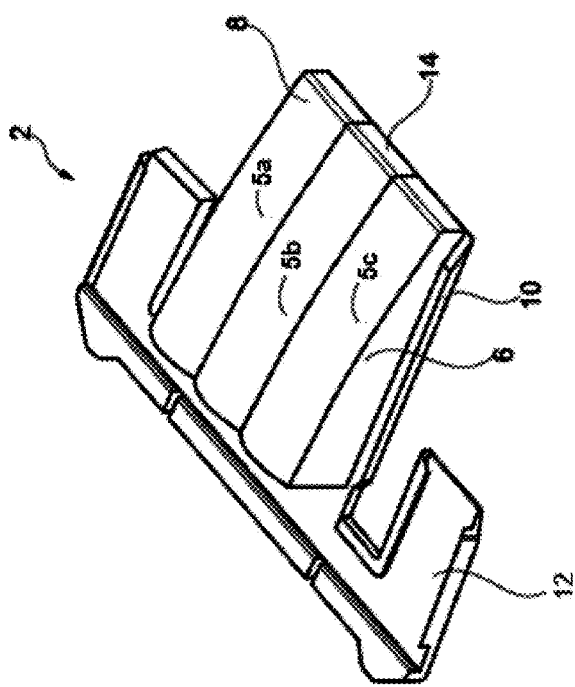
FIG. 4 is a perspective view of the embodiment example according to FIG. 1.

FIG. 4 depicts the light guiding device 2 in a perspective representation. The light guiding device 2, which is optimized for three light sources 18, has a reflection side 6 and reflection layer 8 configured with three funnels, 5a, 5b, and 5c; however more or fewer funnels may be provided if so desired. Still further, the funnels do not have to be identical, but may vary. The longitudinal axis of these funnels extends along the principal direction of the incoupled light. The light guiding device 2 can be adapted for any other number of light sources 18, such as 1, 2, 3, 4, 5, 6 or more.

Figure 6:
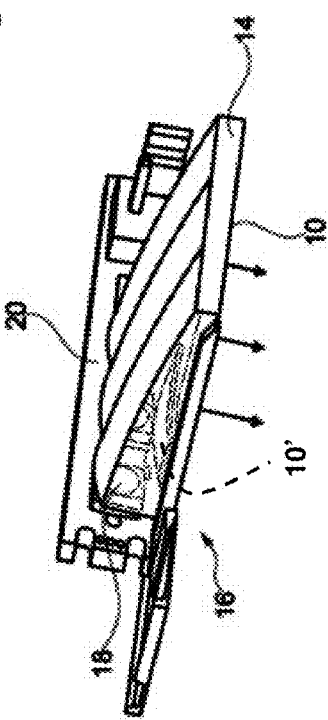
FIG. 6 is a perspective view of an illumination device having a light guiding device with focus on the light outcoupling.

FIG. 5 depicts an illumination device 16 having three light sources 18 which are arranged on a printed circuit board 20. The printed circuit board 20 having the LED light sources 18 is so arranged with respect to the light guiding device 2 that the light is emitted essentially parallel to the light outcoupling side 10, as illustrated by the arrows. To this end, the reflection side 6 and especially the reflection layer 8 deflect the light so that it leaves the light guiding device 2 via the light outcoupling side 10, as seen from the arrows in FIG. 6. As shown in a dotted outline, the light outcoupling side 10 may have a restricted light outcoupling window 10' that provides a homogeneous illumination output over an area less than the entire light outcoupling surface 10.

Figure 7B:
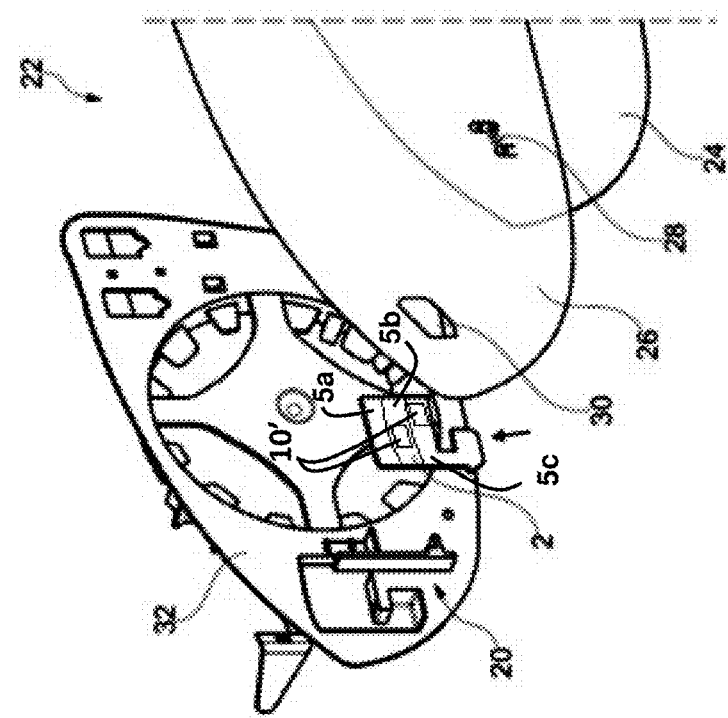
FIG. 7B is an exploded view of a rearview device, similar to FIG. 7A, having a selectively emitting light guiding device.
Figure 7A:
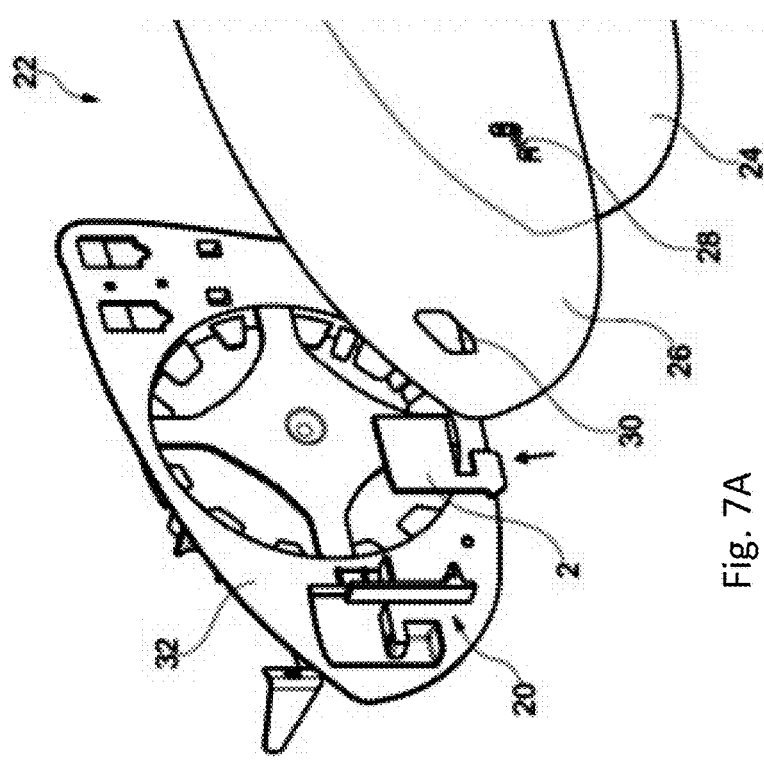
FIG. 7A is an exploded view of a rearview device having a light guiding device.

FIG. 7A depicts an exploded view of a rearview device 22 having a light guiding device 2, which can be arranged on a printed circuit board 20 or directly on a backing plate 32. Backing plate 32 can have a variety of attachment means to secure the printed circuit board, the light source, and/or the light guiding device. Such attachment means can include: glue, tape, snaps, quick connectors, clips, rivets, nails, screws, silicone, prongs as well as other connections and attachments known in the art. The rearview device 22 furthermore has a rearview reflection surface 24, such as mirrored glass, and a heating layer 26 thereunder, wherein the rearview reflection surface 24 has a pictogram 28, for a blind spot monitor indicator, which can be illuminated by the light guiding device 2 and by a recess 30 in the heating layer 26. The printed circuit board 20, light guiding device 2 and rearview reflection surface 24 having the heating layer 26, can be arranged on the backing plate 32. The backing plate 32 also has at least one opening 32a that passes from the rear side of the backing plate 32 to the front side of the backing plate 32. The opening 32a in the backing plate 32 can be formed in the shape of a logo pattern and form a housing within which the light guiding device 2 is mounted.

In addition, the rearview device 22 can also be provided with an actuator attaching the rear side of the backing plate 32 to the rearview reflection surface 24, such that the rearview reflection surface 24 is attached on a front side of the backing plate 32. The attachment means for attaching the actuator to the backing plate 32 can include: glue, tape, snaps, quick connectors, clips, rivets, nails, screws, silicone, prongs as well as other connections and attachments known in the art. For the sake of clarity, the actuator, attachment means and remaining parts of the rearview device 22, are not illustrated.

FIG. 7B depicts an exploded view of a rearview device 22, similar to that shown in FIG. 7A, having a light guiding device 2 that includes restricted light outcoupling windows 10'. Each of the independently operable light guiding funnels 5a, 5b, and 5c may optionally include restricted light outcoupling windows 10' to illuminate a specific portion of the pictogram 28. As illustrated in FIG. 7B, fewer than all of the funnels 5a, 5b, and 5c may include one or more of the outcoupling windows 10' to illuminate select portions of the pictogram 28 or increase the illumination intensity of a portion of the pictogram. In the illustrated embodiment, the pictogram 28 comprises three regions representing a first vehicle, a second vehicle and a region between said two vehicles. Each light source 18 with its associated light guiding funnel 5a, 5b or 5c and light outcoupling window 10' can serve to homogenously illuminate one pictogram region. The light guiding funnels 5a-5c, the associated light sources 18, and the optional restricted light outcoupling windows 10' may emit different colors or may be sequentially strobed to provide an animation component to the pictogram to improve visibility.

Moreover, FIG. 7B depicts an alternate embodiment of the rearview device 22 shown in FIG. 7A and further comprising a white sheet 31. The white sheet 31 is provided in, around, or overlapping the backing plate opening 32a. The white sheet 31 can be comprised of a wooden pulp filter, such as, a piece of paper. Further, the white sheet 31 can be arranged either between the front side of the backing plate 32 and the reflection surface 24 or between the rear side of the backing plate 32 and at least part of the light guiding device 2 and printed circuit board 20. The white sheet 31 can also be next to or on the reflection side 6, forming the reflection layer 8 for example.

The illumination devices and embodiments described herein can be constructed in an exemplary manner as follows. The backing plate 32 can be formed together with the backing plate opening 32a in the shape of a logo, the attachment means for attaching the printed circuit board 20 with the light source 18, and the attachment means for attaching the actuator, by a first injection molding step. A white material can be used in the first injection molding step such that the backing plate is formed from said white material. Further, the white sheet 31 can then be placed on the front or rear of the backing plate 32 and secured by a second molding and/or coating step. In addition, the coating securing the white sheet 31 in place can also be placed on the rear side of the printed circuit board 20 to secure the circuit board 20 to the rear side of the backing plate 32 and the white sheet 31. Optionally, the coating securing the white sheet 31 can also be used to attach the rearview reflection surface 24, such as mirror glass, to the backing plate 32.

Referring now to FIGS. 8A-8D there is illustrated another embodiment of a blind spot monitor having a light guide 102 formed from a transparent or translucent material such as, for example, poly methyl methacrylate (PMMA), a transparent thermoplastic also known as acrylic or acrylic glass. The light guide 102 may also include an outer rim 104 formed of a polymer or plastic material such as, for example, acrylonitrile butadiene styrene (ABS), a thermoplastic polymer exhibiting impact resistance and toughness. The outer rim 104 is attached to the light guide 102 by any suitable method such as a mechanical fit, adhesive fit, or molded to or with the light guiding device 102 to form a light guiding device 106. Alternatively, the light guide 102 may be used without the outer rim 104.

Figure 10:
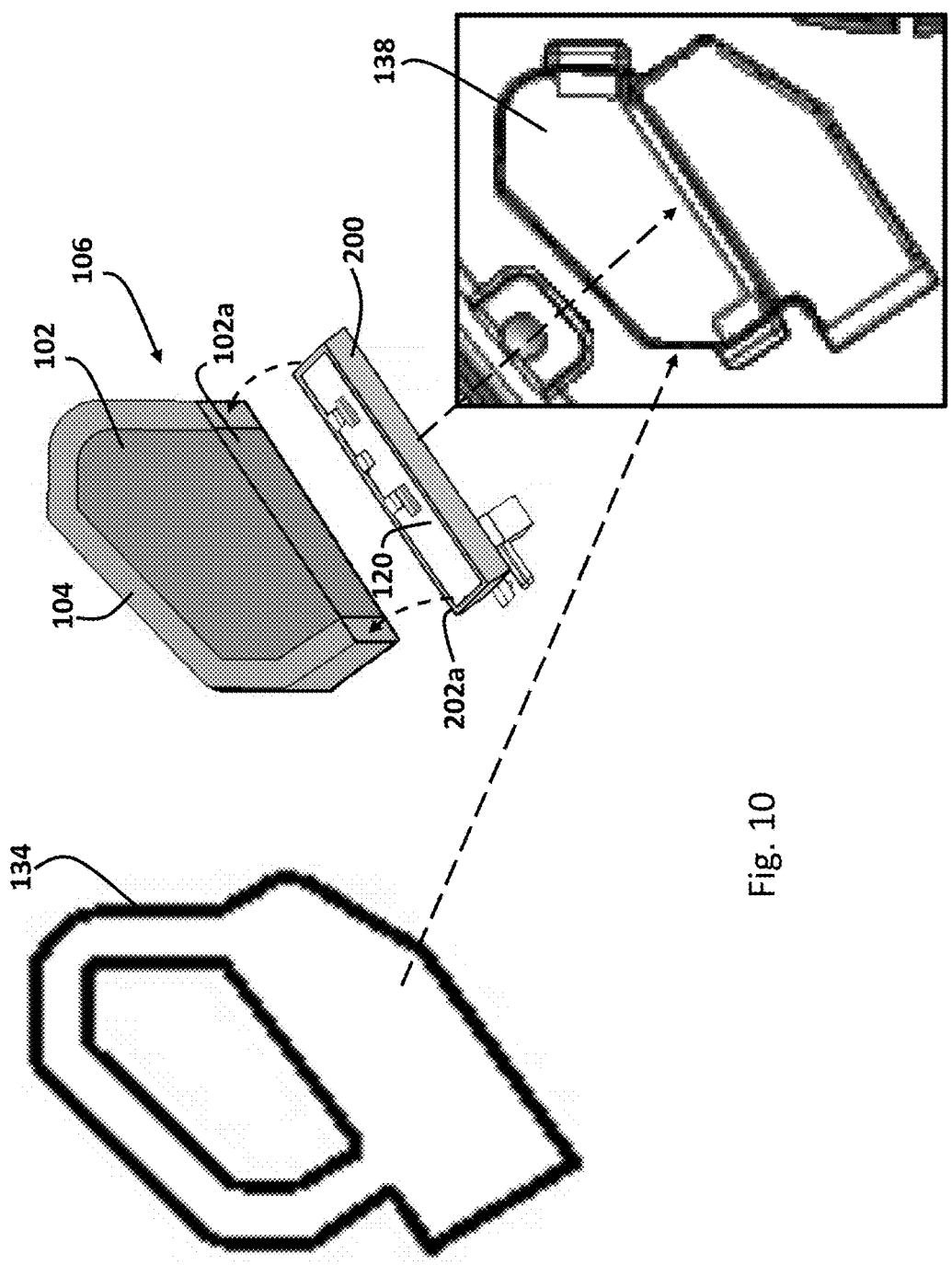
FIG. 10 is an exploded view of the printed circuit board and encapsulation member assembly of FIG. 9A being assembled into the housing of a backing plate.

The light guiding device 106 is configured to be positioned against a printed circuit board (PCB) 120 to form an indicator means, as best shown in one embodiment assembled relative to the dashed arrows of FIG. 10. As shown in FIGS. 8A and 9A, the PCB 120 includes a plurality of light sources 122, such as light emitting diodes (LEDs) 122, and may include sufficient circuitry and control logic to operate the LEDs as part of a blind spot monitoring and detection device. As best shown in FIG. 10, the light guide 102 includes a light incoupling surface 102a to receive light from the LEDs 122. The PCB 120 further includes connectors 148 to provide power and may also receive any control signals necessary for operation as a signal device of a blind spot monitor. The PCB 120 is positioned in a housing or pocket 138 formed in a first side 132a of a backing plate 132. The first side 132a of the backing plate 132 is configured to receive a rearview reflective element 124, such as a mirror glass, containing a pictogram 128. The backing plate 132 further defines a second side 132b that is configured to connect to a mounting and adjustment structure (not shown). As will be described below, the connectors 148 project through to the second side 132b of the backing plate 132 to facilitate connection to power and/or sensor data inputs.

As shown in FIG. 8A the printed circuit board 120 is positioned against a step 142 in a recess 144, defined by the housing 138. FIG. 8B shows an enlarged view of the housing 138 defining the recess 144 configured to support the light guiding device 106. The recess 144 is offset relative to the plane of adjacent surfaces of the first side 132a of the backing plate 132. When assembled, as described below, the light guiding device 106 and the PCB 120 form the indicator means which is generally co-planar and flush with the plane of the first side 132a of the backing plate 132. In the embodiment of FIGS. 8A and 8B, the housing 138 is integrally formed with the backing plate 132. In alternative embodiments, the housing 138 and backing plate 132 may be separate pieces with the housing 138 configured to be secured in an opening (not shown) in the backing plate 132.

The step 142 and the recess 144 of the housing 138 support and orient the light guiding device 106 for exposure of the light outcoupling side to the pictogram 128 of the reflection layer 124. The light guiding device 106 is positioned against the PCB 120 forming the indicator means which is pressed into the housing 138 according to the embodiments shown in FIGS. 8A and 10. In one embodiment, the light guiding device 106 and PCB assembly 120 form an interference fit or press fit with the walls of the housing 138. In one embodiment, two opposite walls of the housing 138 entrap the light guiding device 106 and the PCB 120 with the press fit connection. The press fit connection retains the PCB 120 and LEDs 122 against the light incoupling side 102a of the light guide 102. As shown in FIGS. 8C and 8D, the light guiding device 106 and the printed circuit board 120 are secured to the housing 138 by a fixative mount 134 which may be, but is not limited to, an adhesive tape or a double sided tape. In the illustrated embodiment, the fixative mount 134 is double sided adhesive tape. The fixative mount 134 is attached to the housing 138 to secure both the light guiding device 106 and the printed circuit board 120 and further create a seal against environmental factors.

Referring now to FIG. 9A, the PCB 120 may further be assembled into an encapsulation member 200 prior to assembly into the housing 138. The encapsulation member 200 may be made of an elastomeric material such as a rubber, silicone, or thermoplastic material that exhibits a flexibly and is generally resilient. The encapsulation member 200 forms a seal relative to the PCB 120 and the light guiding device 106 and may also serve as a shock absorber to attenuate vibrations within the blind spot monitor due to vehicle motion. The housing 138 retains the indicator means, the light guiding device 106 and the encapsulated PCB assembly (PCB 120 and encapsulation member 200), within the recess 144 of the backing plate 132.

As shown in FIG. 9B, the encapsulation member 200 includes a perimeter wall 202. In the illustrated embodiment, the perimeter wall 202 forms a generally rectangular box shape, however, any geometric shape suitable to conform to the printed circuit board is contemplated. An upper surface 202a of the perimeter wall 202 may include a flange 204, if so desired, that extends over a portion of the printed circuit board to aid in forming a barrier to seal against moisture or contaminants. The upper surface 202a may optionally include a sealing structure 206, which may be any suitable sealing structure such as, for example, a projecting rim 206a shown in FIG. 9C and/or a rubber lip 206b shown in FIG. 9D. The encapsulation member 200 may include a closed backing 208 that is preferably integrally formed with the perimeter wall 202. The closed backing 208 may include one or more openings 210 to permit electrical connections and/or mounting structures to permit access to or extend beyond the confines of the encapsulation member 200. Alternatively, the encapsulation member 200 may be in the form of a gasket having an open backing.

Referring now to FIG. 10, the assembled PCB 120 and encapsulation member 200 are inserted into the recess 144 of the housing 138. Two spaced-apart perimeter walls 202 of the encapsulation member 200 are press fit within the recess 144 of the housing 138 and seat against the step 142. The light incoupling side 102a of the light guide 102 is positioned to accept light emitted from the LEDs 122 and is pressed against the sealing structure 206a that extends from the upper surface 202a of the encapsulation member 200, thus sealing the PCB 120 from the elements and also from admitting extraneous ambient light, which would detract from the visibility of the projected image. The fixative mount 134 is applied over the assembled light guiding device 106 and encapsulated PCB 120 and 200 positioned in the housing.

FIG. 11 illustrates the attachment of the pictogram-containing mirror 124 to the backing plate 132 of an embodiment of a blind spot monitor, such as the embodiment depicted in FIG. 8C. It can be seen that the pictogram 128 is located over the light guiding device 106 so that light from the light guiding device 106 homogeneously illuminates the pictogram 128. When the fixative mount 134 is configured as a double-sided tape, the outer adhesively coated side is exposed to contact and attach to the back of the pictogram-containing mirror 124.

Referring now to FIGS. 12A-12B, a passageway or access port 146 of the housing 138 is configured to accommodate the connectors 148 of the PCB 120 to power and control the light guiding device 106. FIG. 12A depicts the second side 132b of the backing plate showing the passageway or access port 146 of the housing 138 permitting exposure and access to the connectors 148 of the PCB 120. The access port 146 provides a conduit between the first or front side 132a of the backing plate 132 and the second or back side 132b of the backing plate 132. A wire 150 connects to the connectors of the PCB 120 extending through the passageway 146. FIG. 12B depicts an enlarged view of the passageway 146 and PCB connectors 148 providing access for the wire 150.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A rearview device of a motor vehicle having an indicator device, the rearview device comprising:
    a reflective element;
    indicator means having
        a light guide;
        one or more light sources optically connected to the light guiding device; and
        a printed circuit board operably connected to the light source;
    a backing plate suited to carry the reflective element and having
        a housing configured to support the indicator means, with the indicator means being arranged between the backing plate and the reflective element, and the housing being integrally formed with the backing plate and defining at least one of a recess on a first side of the backing plate, the first side configured to receive the reflective element and a passage that provides access between the first and a second side of the backing plate; and
    sealing means adapted to seal at least part of the indicator means, with the sealing means being provided by at least one of
        an encapsulation member adapted for at least one of supporting at least the light guiding device or protecting at least the printed circuit board within the housing, or
        a fixative mount adapted to secure at least one of the indicator means and the reflective element to the backing plate.

2. The rearview device according to claim 1, wherein the encapsulation member has at least a portion formed as an elastomeric encapsulation member, the elastomeric portion forming an interference fit with two spaced apart walls of the housing or the housing and the reflective element to secure the indicator system.

3. The rearview device according to claim 2, wherein the encapsulation member has at least one of a projecting rim or a rubber lip that interacts with at least one of the housing or the reflective element to form one of a seal or an interference fit.

4. The rearview device according to claim 1, wherein the encapsulation member is configured as a gasket.

5. The rearview device according to claim 1, wherein the encapsulation member is suited to seal the connection between the printed circuit board with the one or more light sources on the one hand and the light guide on the other hand.

6. The rearview device according to claim 1, wherein the fixative mount secures at least one of the indictor means, the encapsulation member, the light guide and/or the printed circuit board to the housing.

7. The rearview device according to claim 1, wherein the fixative mount comprises a double sided tape, or the fixative mount is a double sided tape.

8. The rearview device according to claim 1, wherein the fixative mount attached to the housing creates a seal with the housing.

9. The rearview device according to claim 1, wherein the reflective element comprises a pictogram-containing mirror, which is attached to the backing plate, and wherein the fixative mount adheres to the mirror such that light from the light guiding device illuminates the pictogram.

10. The rearview device according to claim 1, wherein the light guide comprises:
a light incoupling side for incoupling light from each light source;
a reflection side having a reflection layer; and
a light outcoupling side, which is disposed generally opposite the reflection side, wherein a clearance between the reflection side and the light outcoupling side generally decreases as the distance from the light incoupling side increases, and the reflection side having the reflection layer is configured so that light arriving from the light incoupling side is deflected to the light outcoupling side.

11. The rearview device according to claim 10, wherein the housing defines a passage that provides access between a first and a second side of the backing plate to electrically connect the printed circuit board to a power source, to control each light source supported on the printed circuit board;
the encapsulation member forming an interference fit with two spaced apart walls of the housing to secure the light guide to the backing plate, the encapsulation member having at least one of a projecting rim or a rubber lip that interacts with the housing to form at least one of a seal and the interference fit with the housing; and
the fixative mount attached to the housing that creates a seal with the housing and permits the light outcoupling side to illuminate a pictogram portion of a mirror.

12. A rearview device of a motor vehicle having an indicator device, the rearview device comprising:
a reflective element;
indicator means having
a light guide;
one or more light sources optically connected to the light guiding device; and
a printed circuit board operably connected to the light source;
a backing plate suited to carry the reflective element and having
a housing configured to support the indicator means, with the indicator means being arranged between the backing plate and the reflective element; and
sealing means adapted to seal at least part of the indicator means, with the sealing means being provided by at least one of
an encapsulation member adapted for at least one of supporting at least the light guiding device or protecting at least the printed circuit board within the housing, the encapsulation member having at least a portion formed as an elastomeric encapsulation member, the elastomeric portion forming an interference fit with two spaced apart walls of the housing or the housing and the reflective element to secure the indicator system, or
a fixative mount adapted to secure at least one of the indicator means and the reflective element to the backing plate.

13. The rearview device according to claim 12, wherein the encapsulation member has at least one of a projecting rim or a rubber lip that interacts with at least one of the housing or the reflective element to form one of a seal or an interference fit.

14. The rearview device according to claim 12, wherein the encapsulation member is configured as a gasket.

15. The rearview device according to claim 12, wherein the housing is integrally formed with the backing plate and defines at least one of a recess on a first side of the backing plate, the first side configured to receive the reflective element and a passage that provides access between the first and a second side of the backing plate.

16. The rearview device according to claim 12, wherein the fixative mount secures at least one of the indictor means, the encapsulation member, the light guide and/or the printed circuit board to the housing.

17. The rearview device according to claim 12, wherein the fixative mount attached to the housing creates a seal with the housing.

18. A rearview device of a motor vehicle having an indicator device, the rearview device comprising:
a reflective element;
indicator means having
a light guide;
one or more light sources optically connected to the light guiding device; and
a printed circuit board operably connected to the light source;
a backing plate suited to carry the reflective element and having
a housing configured to support the indicator means, with the indicator means being arranged between the backing plate and the reflective element; and
sealing means adapted to seal at least part of the indicator means, with the sealing means being provided by at least one of
an encapsulation member adapted for at least one of supporting at least the light guiding device or protecting at least the printed circuit board within the housing and is suited to seal the connection between the printed circuit board with the one or more light sources on the one hand and the light guide on the other hand, or
a fixative mount adapted to secure at least one of the indicator means and the reflective element to the backing plate.

19. The rearview device according to claim 18, wherein the fixative mount comprises a double sided tape that secures at least one of the indictor means, the encapsulation member, the light guide and/or the printed circuit board to the housing.

20. The rearview device according to claim 18, wherein the encapsulation member is configured to form an interference fit with two spaced apart walls of the housing or the housing and the reflective element to secure the indicator system, or the encapsulation member has at least one of a projecting rim or a rubber lip that interacts with at least one of the housing or the reflective element to form one of a seal or an interference fit, or the elastomeric encapsulation member is configured as a gasket.

* * * * *